United States Patent [19]
Markes

[11] Patent Number: 5,065,517
[45] Date of Patent: Nov. 19, 1991

[54] CIRCLE CUTTER

[76] Inventor: Robby M. Markes, 2344 Bountiful Way, Shingle Springs, Calif. 95682

[21] Appl. No.: 448,554

[22] Filed: Dec. 11, 1989

[51] Int. Cl.⁵ .............................................. B26B 3/08
[52] U.S. Cl. ....................................... 30/300; 30/310
[58] Field of Search ........................... 30/300, 310, 81; 403/328

[56] References Cited

U.S. PATENT DOCUMENTS

| | | | |
|---|---|---|---|
| 681,945 | 9/1901 | Austen . | |
| 1,301,875 | 4/1919 | Prosser . | |
| 2,269,510 | 1/1942 | Bates | 164/71 |
| 2,778,423 | 1/1957 | Zimmerman | 30/300 X |
| 2,932,047 | 4/1960 | Johnston | 403/328 X |
| 2,986,814 | 6/1961 | Brinkman | 30/300 |
| 4,044,464 | 8/1977 | Schiess et al. | 30/164.9 |
| 4,397,593 | 8/1983 | Fordeck | 409/179 |
| 4,621,427 | 11/1986 | Bergler | 30/481 |
| 4,782,730 | 11/1988 | Picone et al. | 83/745 |

Primary Examiner—Mark Rosenbaum
Assistant Examiner—Allan M. Schrock
Attorney, Agent, or Firm—Joseph E. Gerber

[57] ABSTRACT

A circle cutter having an elongate body is disclosed, the body having an awl perpendicularly affixed to one end and a crank handle affixed to the other. The crank handle stands out from the same face of the body as the awl's handle, and parallel to its axis. The awl's bit projects, coaxial with its handle, from the body's opposite face. A cutting block is disposed in a channel in the cutter's body and is variably positionable therealong. One embodiment of the cutter includes a slot in the channel through which the shank of a thumbscrew projects for tightening the cutting block into a fixed position. Another includes a detent ball in the cutting block, the ball being able to engage one of a regularly-spaced series of depressions in the channel's wall.

9 Claims, 3 Drawing Sheets

CIRCLE CUTTER

BACKGROUND OF THE INVENTION

1. Field Of The Invention

The present invention relates generally to hand-operated cutting tools, and more specifically to such tools adapted to cutting a circle in a planar workpiece.

2. Description Of The Related Art

Craftspersons of many types frequently need to cut neat, circular holes in planar sheet material. Various well known tools are available for this purpose. For example, a hole saw affixed to a power drill works well, and if one uses great care a fairly neat circle may be cut with a sabre saw. However, as often occurs on remote building sites, electrical power is not available. Power tools with rechargeable battery packs offer one option, but these are heavy and even a single tool takes up considerable space in a toolbox. In addition, even though a drill-powered hole saw cuts holes with, perhaps, the greatest precision, a drill of sufficient power to cut larger holes is likely to be unwieldy.

Fewer options are found among the hand tools. A keyhole saw is difficult to use, and imprecise in any case. A chisel is so much more crude that it generally goes unconsidered.

As is often the case on a job site, the circular hole to be cut is on a vertical or other non-horizontal surface. This tends to reduce the precision available from all the above tools but the drill-powered hole saw, the hole saw's limitations already having been discussed.

Thus, a need exists for a compact, lightweight hand tool for cutting circles in such planar sheet material as fiberglass, fiberboard, wood and thin metal.

SUMMARY OF THE INVENTION

The circle cutter of the present invention is adapted to fulfill the above-stated need. It comprises an elongate body having an awl perpendicularly affixed to one end, the awl being able to be driven into a workpiece to act as a pivot. At the body's other end is a crank handle for guiding that end through an arc around the pivot. The crank handle stands out from the same face of the body as the awl's handle, and parallel to its axis. The awl's bit projects, coaxial with its handle, from the body's opposite face. Cutting means is disposed upon the cutter's body and is variably positionable therealong.

The cutting means is positionable by tightening a thumbscrew, the shank of which projects through a slot in a channel in the cutter's body adapted to receive the cutting means. Alternatively, the cutting means may include a detent ball able to engage depressions in the wall of the channel.

Thus, it is an object of the present invention to provide a hand-powered tool able to cut precise circles in planar sheet material.

It is a feature of the invention that the pivot of the inventive circle cutter is able to be driven into a workpiece with pressure from the palm and heel of the hand.

It is a further feature of the invention that the circle cutter is operable in cranked fashion around its pivot.

It is yet another feature of the invention to provide a circle cutter wherein the diameter of the circle to be cut is easily adjustable.

It is an advantage of the invention that an accurate, lightweight, durable circle cutting tool may be manufactured and offered for a fraction of the price of powered circle cutting tools.

Still further objects, features and advantages of the inventive circle cutter disclosed herein will be apparent from the drawings and following detailed description thereof.

DESCRIPTION OF THE PREFERRED EMBODIMENT

Figure 1:
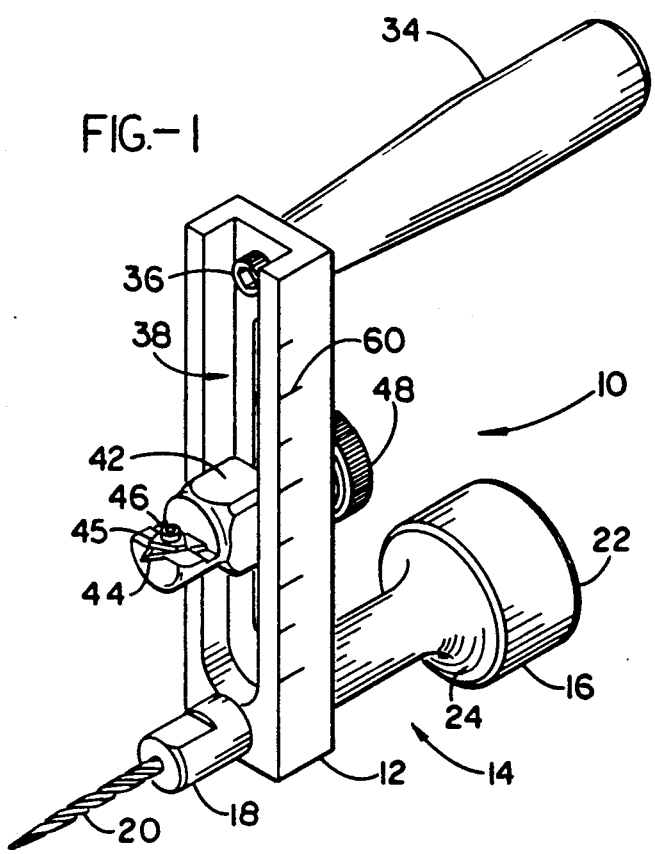
FIG. 1 is a perspective view of the circle cutter of the present invention.

Referring now specifically to the drawings, FIGS. 1 through 6 show the inventive circle cutter, generally designated herein by reference numeral 10. Cutter 10 has an elongate, rectangular body 12 of rigid material, preferably aluminum. Body 12 is approximately five inches long, this being adequate for a hand tool able to cut circles up to approximately eight inches in diameter.

At one end, the "pivoting end," of body 12 is an awl 14. Awl 14 comprises a handle 16, a chuck 18 and a slender spike, or bit, 20. Although the typical tool described as an awl is somewhat simpler in construction than awl 14, when the term "awl" is used herein, and in the claims, it will be understood to refer to the portion of the inventive circle cutter comprised of said handle, chuck and bit.

For the hand-sized tool herein, handle 16 projects about two and a half inches perpendicularly in relation to body 12's length. Handle 16 has a broad, palm pressure-receiving, circular face 22. A diameter of about one and a half inches has been found comfortable for face 22. Handle 16 also has a recessed edge 24 beneath face 22 to facilitate the handle's being grasped by the fingers and pressed against the palm and heel of the hand. Any of a number of rigid materials including metal, wood and plastic may be employed in fashioning handle 16, aluminum having been used with success.

Figure 2:
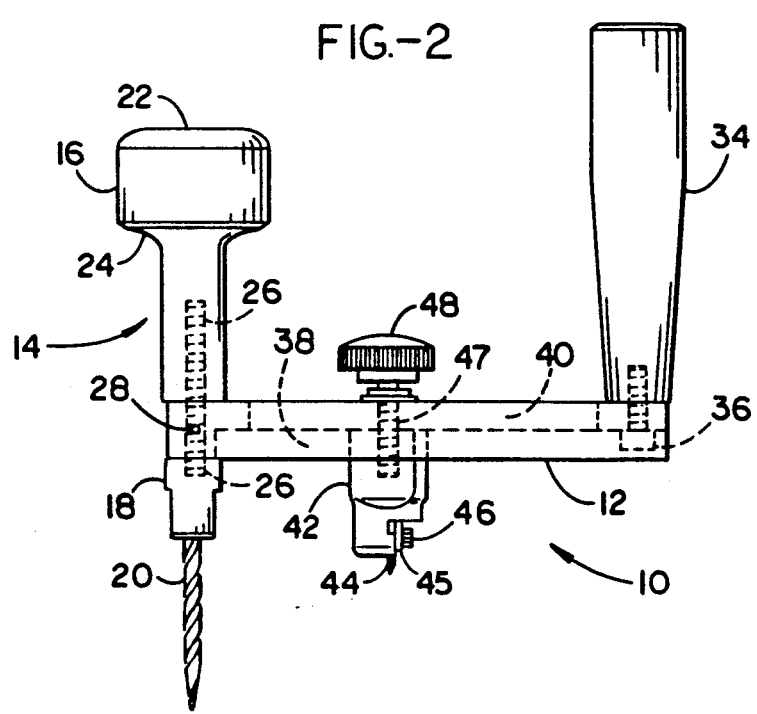
FIG. 2 shows the cutter of FIG. 1 in side elevation.
Figure 3:
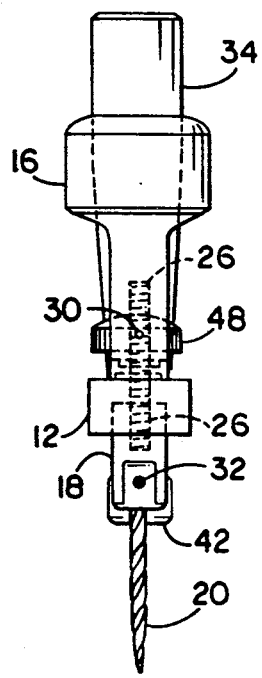
FIG. 3 is an end elevation of the cutter of FIG. 1, viewed from its pivoting end.
Figure 4:
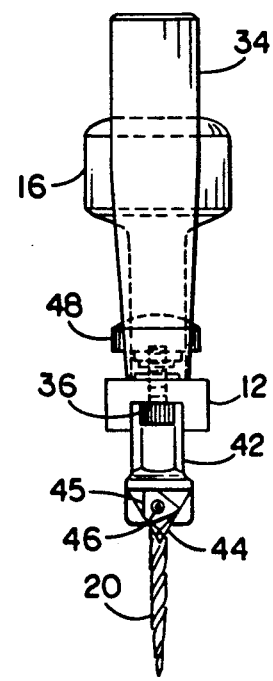
FIG. 4 is an end elevation of the cutter of FIG. 1, viewed from its arc-travelling end.
Figure 5:
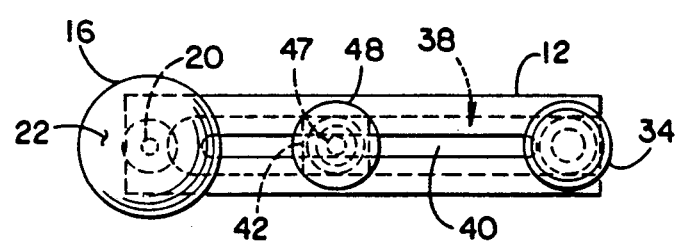
FIG. 5 is a plan view of the cutter of FIG. 1.
Figure 6:
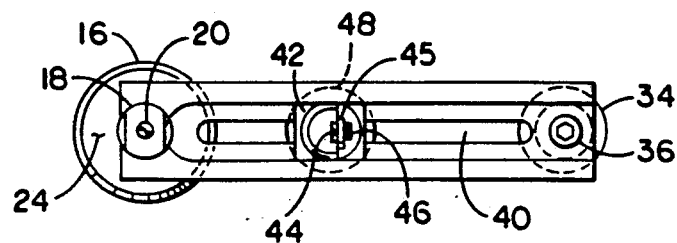
FIG. 6 is a bottom view of the cutter of FIG. 1.

Chuck 18 and bit 20 are disposed coaxial with, and on the opposite side of body 12 from, handle 16. Chuck 18 and handle 16 are bound together by threaded pin 26 which passes through body 12. This is best shown in FIGS. 2 and 3. Chuck 18, handle 16 and pin 26 may be allowed to rotate freely as a unit with respect to body 12, or they may be bound against rotation by means such as roll pins 28 and 30. Chuck 18 is preferably aluminum and includes setscrew 32 to bind bit 20 in place.

Bit 20 is preferably carbide-tipped, spirally-grooved and tapered to a point. Its length should be sufficient to project beyond the cutting means discussed below.

At body 12's opposite end, its "arc traveling end," an elongate, generally cylindrical crank handle 34 stands out parallel with handle 16's axis and from the same side of body 12. Handle 34 is also preferably of aluminum. Its length should be three to four inches, or so, approximating the width of the average palm. A diameter of a little less than an inch is preferred. These dimensions make handle 34 comfortable to grasp in the average fist. Screw 36 binds handle 34 to body 12. Handle 34 may be bound to body 12 either to rotate freely or to remain in fixed relation thereto.

Body 12 has a wide channel 38 running along its length, in the face opposite that from which handles 16 and 34 project. Channel 38 renders body 12 U-shaped in cross-section along most of its length, this being readily apparent from inspection of FIGS. 1 and 3.

Body 12 also has a sot 40 running along its length, slot 40 being cut through the face from which handles 16 and 34 project, into channel 38. Slot 40's length runs between handles 16 and 34.

Channel 38 acts as a guide for variably positionable cutting means such as cutting block 42. Block 42 carries triangular blade 44 which is held in place by triangular washer 45 and allen screw 46. Screw 46 may be loosened in order to turn blade 44, thereby exposing a fresh, sharp cutting edge. Through slot 40, block 42 receives the threaded, axial shank 47 of thumbscrew 48 as shown in FIGS. 2 and 3. When tightened, thumbscrew 48 locks block 42 in position for cutting a circle of desired diameter.

Figure 7:
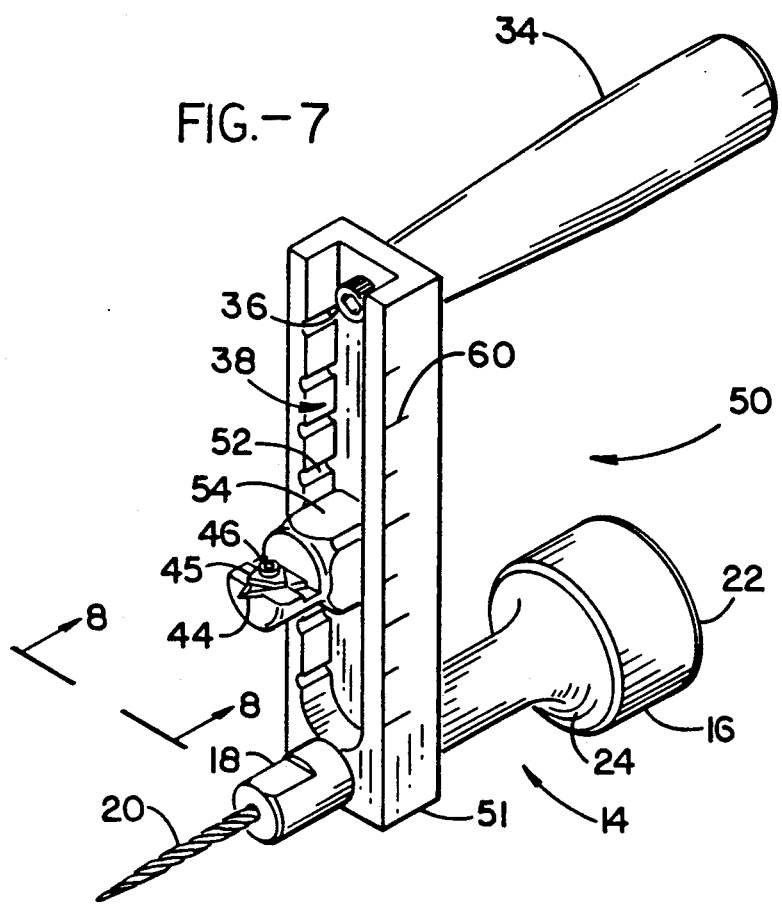
FIG. 7 is perspective view of an alternative circle cutter employing a ball-detent to aid in positively positioning its cutting block.
Figure 8:
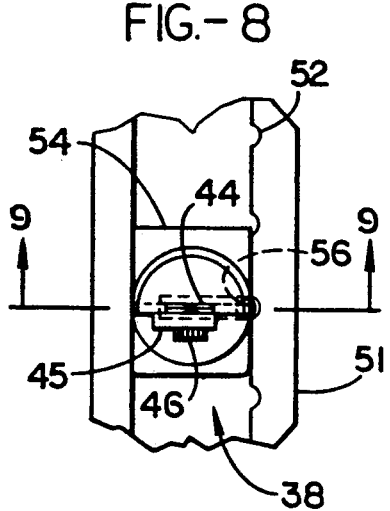
FIG. 8 is an enlarged bottom view along lines 8—8 of the alternative cutting block of the cutter of FIG. 7.
Figure 9:
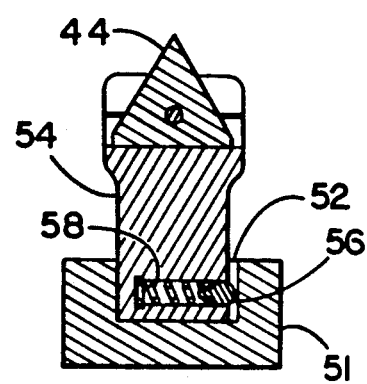
FIG. 9 is a cross-section of the cutting block and body of the cutter of FIG. 7, along lines 9—9, showing the structure of the ball-detent positioning aid.

In an alternative embodiment of this inventive circle cutter, generally designated by reference numeral 50 and shown in FIG. 7, channel 38 of alternative body 51 has a series of regularly-spaced shallow depressions (grooves 52) along at least one of its walls. Grooves 52 are semicircular in cross-section. An alternative cutting block 54 is employed with this alternative cutter 50. Block 54 has a spring-biased detent ball 56 in one of its side faces to seat in a groove 52, thereby holding the block in place for cutting a circle of a desired diameter. Alternative cutting block 54 is shown enlarged in FIG. 8, and in cross-section revealing spring 58 in FIG. 9. Cutter 50 needs not include slot 40, as thumbscrew 48 is not needed to fix block 54 in place.

As it is usually necessary to cut circles of known diameter, a scale of longitudinal measurement 60 graduated in regularly-spaced increments along the cutter's body as in FIGS. 1 and 7 has been found useful. Thus, whether cutting block 42 or alternative cutting block 54 is used it may be fixed at any point along the scale to eliminate the need to measure the distance between the awl's bit and the blade.

In use, the inventive cutter is manipulated as follows. First, the cutting block's distance from the awl's bit is adjusted to match the radius of the circle to be cut. Next, the awl's handle is gripped with the fingers, pressing its broad face against the palm and heel of the hand. The tip of the awl's bit is then placed against a planar workpiece's surface, at the center of the intended circular hole, with the awl in perpendicular relation to the surface. A few twists of the wrist will drive the awl's bit into the workpiece, bringing the cutter's blade into contact with its surface. The free hand is then used to grasp the crank handle and to guide the cutter's arc-travelling end, along with the cutter's blade, in a circular path around the awl. Axial pressure should be maintained upon the awl with the palm and heel of the hand, and along the crank handle's axis as well, to drive the blade into the workpiece and to cut it through.

The foregoing detailed disclosure of the inventive circle cutter is considered as only illustrative of the preferred embodiment of, and not a limitation upon the scope of, the invention. Those skilled in the art will envision many other possible variations of the structure disclosed herein that nevertheless fall within the scope of the following claims. For example, the dimensions recited are not considered limiting; the usefulness of smaller as well as larger versions is foreseen. And, many blade designs, and means of fixing cutting blocks in place, are known in the art. In particular, it is contemplated that a cutting wheel may be used for cutting softer materials such as rubber, and the like. It is also noted that channels of various different cross-sections may accommodate cutting blocks of alternative shapes. Additionally, alternative uses for this inventive cutter may later be realized. Accordingly, the scope of the invention should be determined with reference to the appended claims, and not by the examples which have herein been given.

I claim:

1. A circle cutting hand tool comprising, in combination:
   a. an elongate body having a pivoting end and an arc-traveling end;
   b. an awl, perpendicular to said body at its pivoting end;
   c. a crank handle, parallel to said awl and perpendicular to said body at said body's arc-traveling end;
   d. a channel along a substantial length of said body, said channel having a series of regularly-spaced depressions along a wall thereof; and,
   e. cutting means disposed in a channel between said body's ends, said cutting means having a detent ball projecting therefrom for engaging said depressions in said wall of said channel.

2. The tool of claim 1 wherein said awl's handle includes a broad face adapted to receive palm pressure, said handle further including a recess under said face to accommodate said handle's being grasped by the fingers.

3. The tool of claim 1 wherein said crank handle projects substantially farther from said body than said awl's handle.

4. The tool of claim 1 wherein said awl includes a chuck and a bit on the opposite side of said body from said awl's handle.

5. The tool of claim 4 wherein said bit is spirally grooved.

6. The tool of claim 1 wherein said channel is U-shaped.

7. The tool of claim 1 wherein said body includes a longitudinal slot therethrough, and wherein a thumbscrew with a threaded axial shank projects through said slot for binding said cutting means in place.

8. A circle cutting hand tool comprising, in combination:
   a. an elongate body having a pivoting end and an arc-traveling end;
   b. a U-shaped channel along a substantial portion of said body's length, said channel having a series of regularly-spaced depressions along a wall thereof;
   c. an awl, perpendicular to said body at its pivoting end, said awl having a handle including a broad face adapted to receive palm pressure, said handle further including a recess under said face to accommodate said handle's being grasped by the fingers;

d. a generally cylindrical crank handle, parallel to said awl and perpendicular to said body at said body's arc-traveling end; and, e. cutting means disposed between said body's ends and engaging said channel, said cutting means having a detent ball projecting therefrom able to be received by said depressions in said channel.

9. A circle cutting hand tool comprising, in combination:

a. an elongate body having a pivoting end and an arc-traveling end;

b. a U-shaped channel along a substantial portion of said body's length, said channel having a series of regularly-spaced depressions along a wall thereof;

c. an awl, perpendicular to said body at its pivoting end, said awl having a handle including a broad face adapted to receive palm pressure;

d. a crank handle, parallel to said awl and perpendicular to said body at said body's arc-traveling end, said crank handle being substantially longer than said awl's handle, and, e. cutting means disposed between said body's ends and engaging said channel, said cutting means having a detent ball projecting therefrom able to be received by said depressions in said channel.

* * * * *